Figure 5:
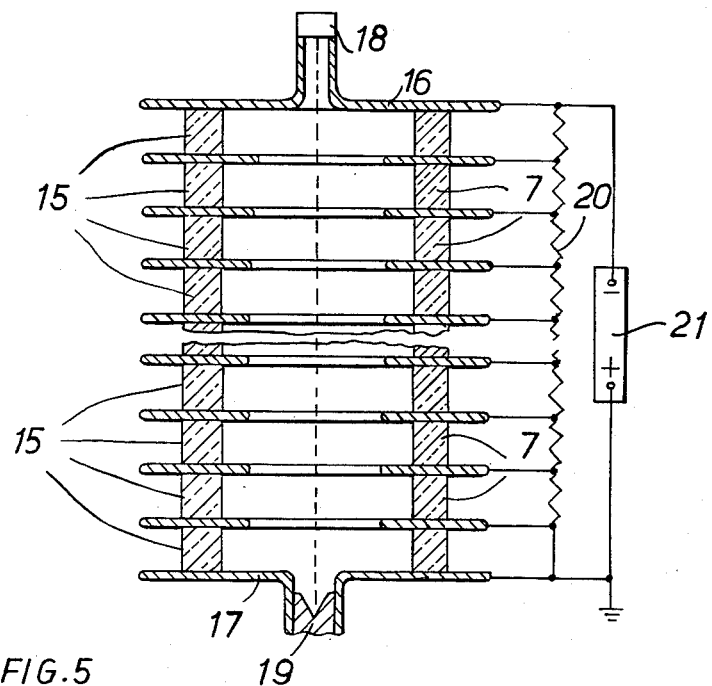

March 29, 1966　　　J. ROXBURGH　　　3,243,655
ELECTRODE AND INSULATOR STACK ASSEMBLY
Filed May 23, 1963　　　　　　　　　　　　　　　2 Sheets-Sheet 1
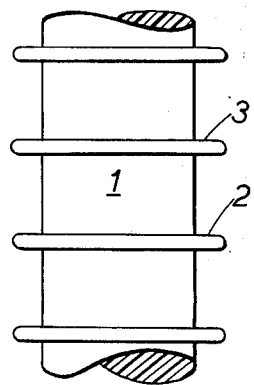
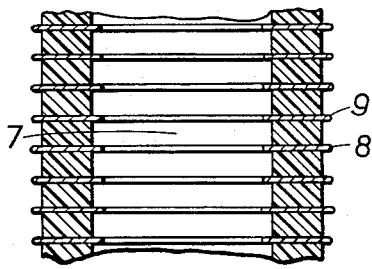
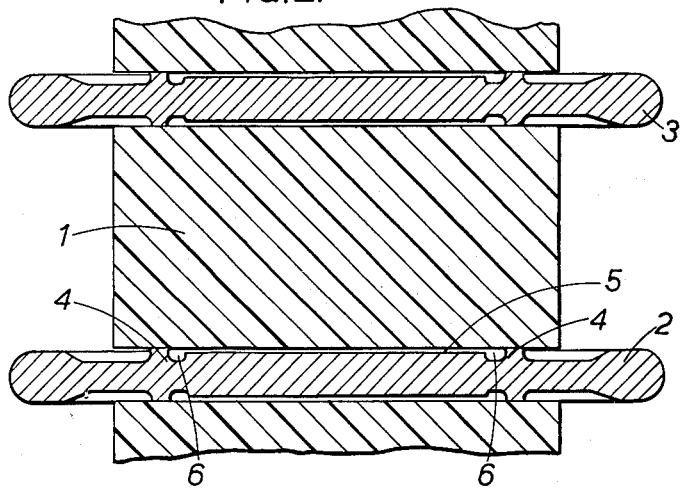
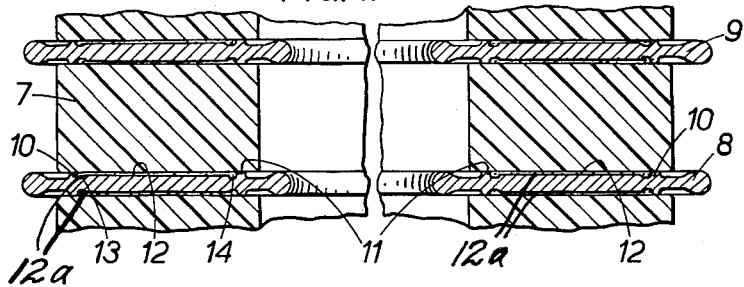

United States Patent Office 3,243,655
Patented Mar. 29, 1966

3,243,655
ELECTRODE AND INSULATOR STACK ASSEMBLY
John Roxburgh, Davyhulme, Manchester, England, assignor to Associated Electrical Industries Limited, London, England, a British company
Filed May 23, 1963, Ser. No. 282,707
Claims priority, application Great Britain, June 1, 1962, 21,244/62
2 Claims. (Cl. 315—312)

This invention relates to a high voltage electrical equipment of the type in which high voltage electrodes are separated by solid dielectric. The invention has an important application in particle accelerators.

The electrical breakdown across the surface of a solid dielectric occurs at a much lower voltage than would be required if the solid dielectric were removed.

It has been observed that electrical breakdown across the surfaces of high voltage insulators is preceded by discharge phenomena at the electrode-dielectric junction. This trouble can be especially noticeable if an adhesive film is employed, since it is difficult to control the thickness accurately and thus the mechanical strength of the junction is unreliable and the dimensional accuracy is poor.

The main object of the invention is to provide an improved arrangement in which the tendency towards electrical breakdown is appreciably reduced.

According to the present invention high voltage electrical equipment comprises high voltage electrodes in the form of discs or plates separated by solid insulation from the face of which insulation the electrodes protrude and clearance is provided between the insulation and the electrode adjacent the insulation face and abutting surfaces are formed on the electrodes and insulation at positions spaced from the insulation surface.

Additional clearance may be provided between the insulation and electrodes at positions separated from the insulation face by the said abutting surfaces which additional clearance accommodates an adhesive.

According to one embodiment the equipment is in the form of a particle accelerator comprising a stack of annular insulating members and electrodes protruding beyond the internal and external faces of the insulation and with clearance provided between the insulation and the electrodes at both the internal and external faces of the stack and with inner and outer circular abutting surfaces respectively terminating said inner and outer clearances. Preferably the mating faces of the insulation are plane and the clearance is provided by recesses formed in the electrodes. Alternatively, the recesses may be formed in the insulation or partly in the insulation and partly in the electrodes.

In order that the invention may be more readily understood reference will now be made to the accompanying drawings, in which:

FIG. 1 shows a cylindrical stack of insulators according to the present invention,
FIG. 2 shows in detail a cross section of one such insulator,
FIG. 3 shows an annular stack of insulators,
FIG. 4 shows in detail a cross section of one such insulator, and
FIG. 5 shows an example of a particle accelerator to which the invention can be applied.

In FIGS. 1 and 2 the cylindrical block of dielectric 1 separates the two electrodes 2 and 3. Taking electrode 2 to be the negative electrode, on its surface is a raised ring 4 in contact with the dielectric. Enclosed by the ring 4 is a circular area 5 which is plane and parallel to the face of the dielectric block and which is separated from the dielectric by a small distance—e.g. 0.003″. Between the area 5 and the ring 4 is a trough 6. When the insulator is assembled adhesive is spread on the area 5 and the electrode is then pressed into place against the block 1. Excess adhesive is forced out of the joint into trough 6. The raised ring 4 ensures that the correct thickness of adhesive remains, and a strong joint is formed.

In order to improve the electrical properties of the insulator it is only necessary to form a raised ring on the more negative of two electrode surfaces separated by dielectric. However, in order to improve the mechanical properties of the insulator and to avoid confusion in assembly the more positive of two such surfaces may also be formed with a raised ring. This has the additional advantage of making the polarity of the apparatus reversible. If it is desirable from a manufacturing point of view the electrode may be made from two halves each of which has one surface with a raised ring and one flat surface, the two flat surfaces of the two halves being bolted together.

In FIGS. 3 and 4 the dielectric 7 is in the form of an annular block between the negative and positive annular electrodes 8 and 9. The inside diameter of the annular electrodes 8 and 9 being smaller than the inside diameter of the annular dielectrics 7 and outside diameter of the annular electrodes 8 and 9 being greater than the outside diameter of the annular dielectrics 7. Each electrode is formed with two concentric raised rings 10, 11 on its surface, and the surface enclosed between them is the adhesive area 12 filled with adhesive 12a. Two troughs 13, 14 are provided for excess adhesive. The raised rings 10, 11 ensure that the spacing between the surface 12 and the dielectric block 7 is correct. As in FIG. 2 there is no need from the electrical point of view to form electrode 9 with two concentric raised rings, this is done for mechanical reasons.

FIG. 5 shows a particle accelerator comprising a series of annular accelerating electrodes 15 separated by annular insulators 7. There are AND electrodes 16 and 17 at the inlet and outlet ends respectively with an ion source 18 at the inlet end and a collector 19 at the outlet end.

The electrodes 17 are connected to tapping points on a resistor 20 connected across a voltage source 21. The electrodes 15 could be constructed as electrodes 8 and 9 in FIG. 4.

What I claim is:
1. A particle accelerator comprising a stack of annular electrodes, means for applying graduated accelerating potentials to said electrodes, annular solid insulators interposed between said electrodes in abutting relationship, the outside diameter of each electrode being greater than the outside diameter of each insulator and the inside diameter of each electrode being smaller than the inside diameter of each insulator, so that said electrodes protrude inwardly and outwardly of said insulators respectively, said electrodes and said insulators having surfaces adhesively bonded together, the surfaces of said electrodes having at least one raised portion thereon engaging the surface of the adjacent insulator to maintain said adjacent surfaces in predetermined spaced relation, adhesive filling the space between said adjacent surface, and a groove in each electrode surface adjacent said raised portion to form a reservoir for excessive adhesive.

2. A particle accelerator comprising a stack of annular electrodes, means for applying graduated accelerating potentials to said electrodes, annular solid insulators interposed between said electrodes in abutting relationship, the outside diameter of each electrode being greater than the outside diameter of each insulator and the inside diameter of each electrode being smaller than the inside diameter of each insulator, so that said electrodes protrude inwardly and outwardly of said insulators respectively, concentric raised rings on said electrodes to maintain the surface of the electrode between said rings and the adjacent insulator surface in a predetermined spaced relation, adhesive filling the space between the electrode surface and insulator surface to bond the electrode and insulator together, and grooves adjacent said raised rings to form reservoirs for excess adhesive to assure proper spacing of the electrodes and insulators.

References Cited by the Examiner

UNITED STATES PATENTS

| 971,935 | 10/1910 | Simon | 313—268 X |
|---|---|---|---|
| 1,902,872 | 3/1933 | Long | 161—130 X |
| 2,135,085 | 11/1938 | Ludwig et al. | 313—268 X |
| 2,501,882 | 3/1950 | Trump et al. | 313—355 X |
| 3,036,233 | 5/1962 | Petrie et al. | 313—257 X |
| 3,043,147 | 7/1962 | Will | 74—5 |

JOHN W. HUCKERT, *Primary Examiner.*

DAVID J. GALVIN, *Examiner.*

D. E. PITCHENIK, *Assistant Examiner.*